(12) United States Patent
Sidler

(10) Patent No.: US 10,663,067 B2
(45) Date of Patent: May 26, 2020

(54) SLIDE VALVE, PREFERABLY FOR CLOSING OFF A MEDIA CONVEYING LINE

(71) Applicant: SISTAG AG, Eschenbach (CH)

(72) Inventor: Hans-Joerg Sidler, Eschenbach (CH)

(73) Assignee: SISTAG AG, Eschenbach (CH)

( * ) Notice: Subject to any disclaimer, the term of this patent is extended or adjusted under 35 U.S.C. 154(b) by 0 days.

(21) Appl. No.: 15/760,252

(22) PCT Filed: Aug. 31, 2016

(86) PCT No.: PCT/EP2016/070509
§ 371 (c)(1),
(2) Date: Mar. 15, 2018

(87) PCT Pub. No.: WO2017/045923
PCT Pub. Date: Mar. 23, 2017

(65) Prior Publication Data
US 2018/0252322 A1 Sep. 6, 2018

(30) Foreign Application Priority Data

Sep. 16, 2015 (CH) ........................................ 1361/15

(51) Int. Cl.
*F16K 3/02* (2006.01)
*F16K 1/226* (2006.01)
(Continued)

(52) U.S. Cl.
CPC .......... *F16K 3/0227* (2013.01); *F16K 1/2263* (2013.01); *F16K 3/02* (2013.01);
(Continued)

(58) Field of Classification Search
CPC .... F16K 3/0227; F16K 3/0245; F16K 3/0281; F16K 3/0263; F16K 3/20; F16K 3/316;
(Continued)

(56) References Cited

U.S. PATENT DOCUMENTS 2,774,371 A * 12/1956 Grannenfelt .......... F16K 3/0281
137/242
4,206,905 A 6/1980 Dobler
(Continued)

FOREIGN PATENT DOCUMENTS

CH      523453 A  *  5/1972  ........... F16K 3/0281
DE      2658809 A1   6/1978
(Continued)

OTHER PUBLICATIONS

Abstract of DE 202007001562 U1.
Abstract of DE 2658809 A1.
Abstract of DE 102009011363 B3.

*Primary Examiner* — Hailey K. Do
(74) *Attorney, Agent, or Firm* — Brian Roffe

(57) ABSTRACT

Slide valve, preferably for closing off a media conveying line, is provided with a housing having a through-opening, a slide plate that can be moved therein, as well as a sealing arrangement. This sealing arrangement is formed as a single piece from a profile that partially surrounds the through-opening, as well as from transverse longitudinal seals connected thereto. At the ends of the legs of the profile, on both sides, two longitudinal seals, arranged parallel to and spaced at a distance from one another, are connected to the lateral face of the profile. This one-piece sealing arrangement allows the slide valve to be manufactured and assembled simply.

20 Claims, 4 Drawing Sheets

(51) Int. Cl.
*F16K 3/316* (2006.01)
*F16K 3/08* (2006.01)
*F16K 3/18* (2006.01)

(52) U.S. Cl.
CPC ............ *F16K 3/316* (2013.01); *F16K 3/0281* (2013.01); *F16K 3/08* (2013.01); *F16K 3/18* (2013.01)

(58) Field of Classification Search
CPC .......... F16K 27/04; F16K 27/044; F16K 3/02; F16K 3/0218; F16K 3/0236; F16K 3/16; F16K 3/205; F16K 3/207; F16K 5/0564; F16K 5/0471; F16K 3/12
See application file for complete search history.

(56) References Cited

U.S. PATENT DOCUMENTS

| | | | |
|---|---|---|---|
| 4,279,402 A | 7/1981 | Wey et al. | |
| 4,429,710 A * | 2/1984 | Grieves | F16K 3/02 137/242 |
| 4,522,224 A | 6/1985 | Stadler et al. | |
| 4,546,788 A | 10/1985 | Stadler et al. | |
| 4,646,777 A | 3/1987 | Stadler et al. | |
| 4,742,990 A | 5/1988 | Stadler et al. | |
| 5,271,426 A | 12/1993 | Clarkson et al. | |
| 5,549,278 A | 8/1996 | Sidler | |
| 5,653,423 A * | 8/1997 | Young | F16K 3/0227 251/326 |
| 6,010,112 A | 1/2000 | Sidler | |
| 7,014,164 B2 | 3/2006 | Sidler | |
| 7,946,556 B1 | 5/2011 | Trott | |
| 8,091,194 B2 | 1/2012 | Clatot | |
| 8,235,355 B2 | 8/2012 | Sidler | |
| 8,327,870 B2 | 12/2012 | Sidler | |
| 8,365,760 B2 | 2/2013 | Sidler | |
| 2005/0218368 A1 | 10/2005 | Vanderberg et al. | |
| 2006/0255305 A1 | 11/2006 | Comstock et al. | |
| 2008/0199291 A1 | 8/2008 | Clatot | |
| 2009/0121173 A1 * | 5/2009 | Devine, Jr. | F16K 3/0227 251/328 |
| 2014/0021397 A1 | 1/2014 | Painter | |

FOREIGN PATENT DOCUMENTS

| | | | | |
|---|---|---|---|---|
| DE | 102005004711 B3 * | 3/2006 | ............ | F16K 3/0281 |
| DE | 202007001562 U1 | 3/2007 | | |
| DE | 102009011363 B3 | 1/2010 | | |
| EP | 2216572 A2 | 8/2010 | | |
| EP | 1886322 B1 | 3/2013 | | |
| WO | 2005098288 A1 | 10/2005 | | |
| WO | 2006124522 A1 | 11/2006 | | |
| WO | 2012024195 A1 | 2/2012 | | |
| WO | 2012100287 A1 | 8/2012 | | |
| WO | 2017045923 A1 | 3/2017 | | |

* cited by examiner

SLIDE VALVE, PREFERABLY FOR CLOSING OFF A MEDIA CONVEYING LINE

FIELD OF THE INVENTION

The invention relates to a slide valve, preferably for closing off a media-conveying line.

BACKGROUND OF THE INVENTION

Such generic slide valves are used for, among other things, opening and closing lines for the conveyance of media, such as for example in purification plants with raw sewage or sludge, in chemistry involving granulated material, chemical liquids etc., in the food industry involving drinking liquids, cereals or rinsing fluids or similar.

With one such slide valve according to publication EP-A-2 216 572, a two-part housing and a slide plate that can be moved relative to the latter in order to open or close a through-opening is provided. With this slide valve, longitudinal seals are contained in the housing above the through-opening, which longitudinal seals are aligned transversely to the direction of shifting the slide plate and form a flexible seal between the housing and the slide plate on the upper side.

In addition, for the lateral and lower sealing between the slide plate and the housing, a sealing cord or the like and an end seal are provided which together form an all-round seal between the slide plate and the housing in the closed state. A permanent and secure seal is thus formed when the slide valve is closed. However, when there is a high degree of media pressure leaks may occur between the individual seals.

However, such slide valves are also used in lines for the conveyance of media with abrasive properties, such as oil sand, wherein the lines have flow-through openings with dimensions of up to 1,000 mm and are operated at high pressures. For example, when oil sand is to be conveyed, the latter contains mixtures of minerals which are the size of grains of sand, the size of a fist or clump-sized. Since these lines are generally laid outdoors, they are also subjected to large temperature differences. Additional demands are therefore made of the slide valve so that it always performs the required sealing function and thereby has a long service life.

OBJECTS AND SUMMARY OF THE INVENTION

The object underlying the present invention was to improve a slide valve such that it is easy to produce and to assemble and thereby guarantees a reliable and permanent seal.

According to the invention, this object is achieved by a slide valve including a housing defining a through-opening, a slide plate movable in the housing between a closed position closing the through-opening and an open position in which the through-opening is open to enable conveyance of media through the slide valve, and a single-piece sealing arrangement for providing sealing for the slide valve. The sealing arrangement includes a profile that partially surrounds the through-opening, has first and second lateral faces on opposite sides of the profile, and includes first and second legs, at least one first transverse longitudinal seal on a first side of the through-opening having first and second ends connected to the first lateral face of the profile with the first end being connected to the first leg and the second end being connected to the second leg, and at least one second transverse longitudinal seal on the first side of the through-opening having first and second ends connected to the second lateral face of the profile with the first end being connected to the first leg and the second end being connected to the second leg.

The slide valve according to the invention makes provision to form the sealing arrangement as a single piece from a profile that partially surrounds the through-opening as well as from the transverse longitudinal seals connected thereto.

With this design of the sealing arrangement it is possible to produce the slide valve in a compact construction.

Moreover, when conveying, for example, oil sand, great demands are made upon the slide valve due to the abrasion that occurs and the clogging with thickened material. With the single-piece sealing arrangement according to the invention made of an appropriate plastic, the best requirements in this regard for a long service life are also fulfilled.

With this single-piece design of the sealing arrangement, another considerable advantage is offered by it first of all being inserted as a single piece into one housing part, and the other housing part then being able to be correspondingly attached so that simple assembly is thus made possible.

Further advantageous details of the slide valve within the framework of the invention are defined in the dependent claims.

DETAILED DESCRIPTION OF THE INVENTION

Figure 1:
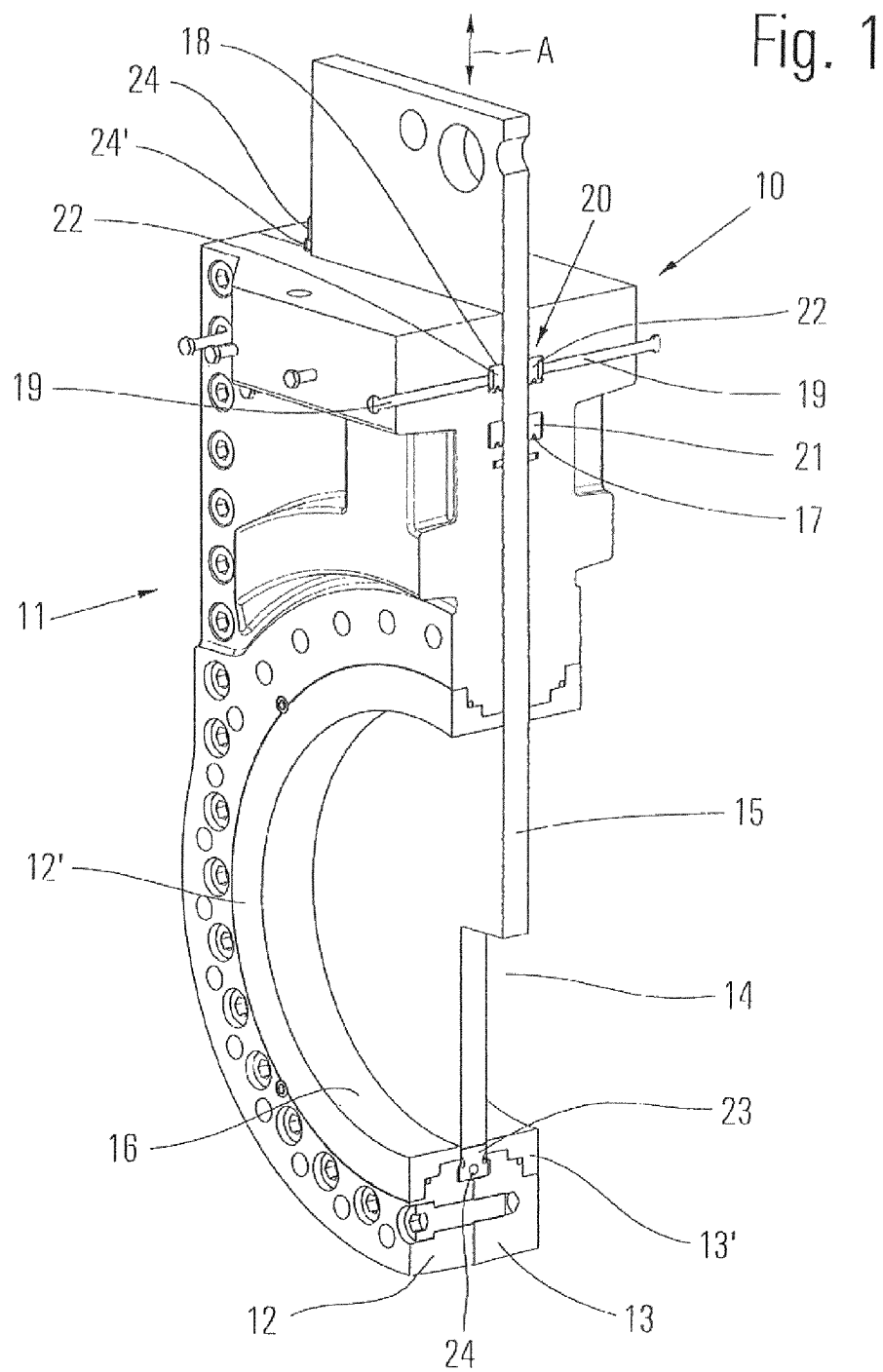
FIG. 1 is a perspective view of a longitudinally sectioned slide valve according to the invention.

FIG. 1 shows a slide valve 10 which is substantially composed of a housing 11 with two housing parts 12, 13 and a slide plate 15. Provided in the housing 11 is a transverse through-opening 14 which is closed by the slide plate 15 when it is moved downwards. Connected at this through-opening 14 are lines (not detailed) which advantageously have an internal diameter like that of the bore hole 16 of the housing 11 so that no dead zones are created due to ledges.

This slide valve 10 is designed, for example, for closing off lines conveying oil sand. However, it could needless to say also be used for closing off the conveyance of other media.

A sealing arrangement 20 is provided for totally sealing off the slide valve to the outside and between the slide plate 15 and the housing 11 in the closed state. For this purpose, above the through-opening 14 on both sides of the slide plate 15, in each case two transverse, lower longitudinal seals 21 or upper longitudinal seals 22 as well as a seal acting on the outside of the slide plate both laterally and on the lower rounding are contained in the housing parts 12, 13.

Figure 3:
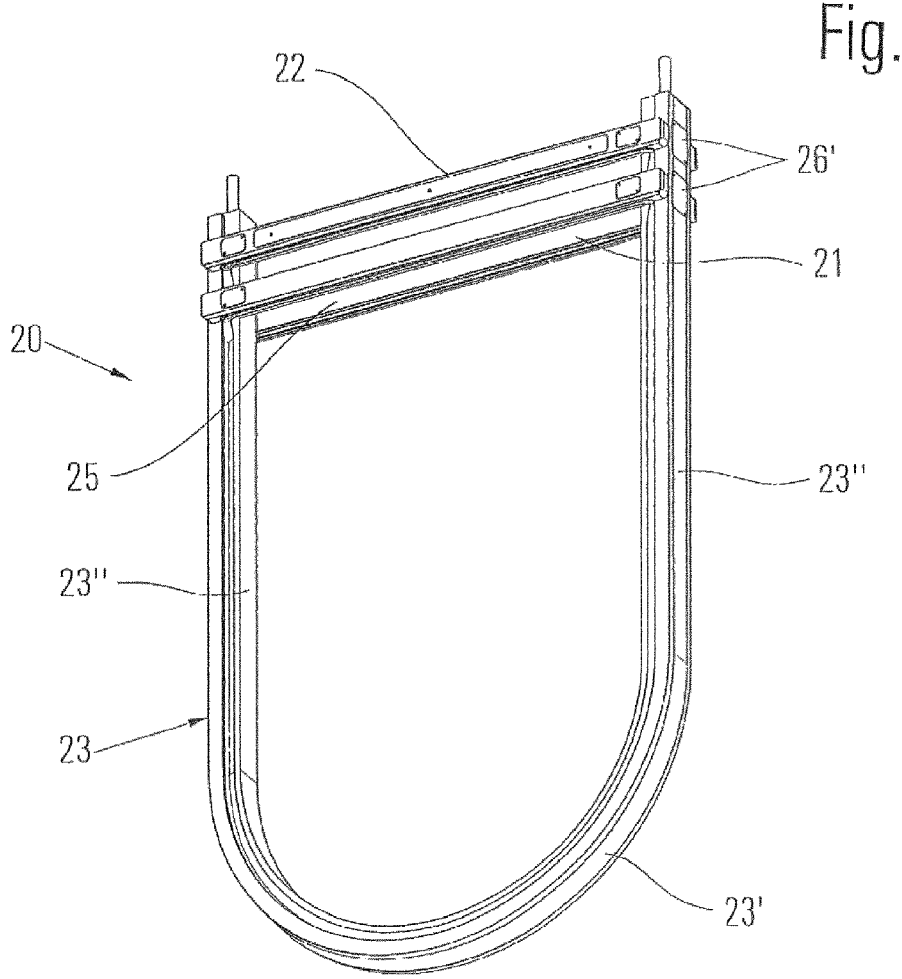
FIG. 3 is the sealing arrangement according to the invention for the slide valve according to FIG. 1 in a perspective view.

As is evident in particular from FIG. 3, according to the invention the sealing arrangement 20 is formed as a single piece from a profile 23 that partially surrounds the through-opening 14, as well as from the transverse longitudinal seals 21, 22 connected thereto.

This single-piece sealing arrangement 20 is advantageously produced from a plastic for which polyurethane, which is very wear-resistant, is preferably used. In this connection, it can be cast, be produced by a 3D printer and/or also be produced from one piece by machining. Theoretically, the profile 23 could, for example, be connected to the longitudinal seals 21, 22 by welding, vulcanizing or the like to form this single-piece sealing arrangement 20.

This profile 23 formed in a U shape consists of an arched part 23' and legs 23" passing from the latter. At the ends of these legs 23", on both sides, two longitudinal seals 21, 22, spaced apart from one another, are each connected to the profile 23, these longitudinal seals each bordering on the lateral face of the profile.

In its arched part 23', the profile 23 is provided with a rounding corresponding to the through-opening 14 and is fitted in the housing 11 such that with its inside, at this rounding it runs almost flush with this bore hole 16 of the housing that forms the through-opening 14.

Furthermore, in these housing parts 12, 13 annular bodies 12', 13' are used with the bore hole 16 which advantageously engage behind the graduated profile 23 in order to hold the latter.

These longitudinal seals 21, 22 that run spaced apart from one another can each be introduced into a longitudinal groove 17, 18 in the respective housing part 12, 13 which extends transversely to the direction A of moving the slide plate 15 and are mounted therein such as to be able to move in the transverse direction.

Figure 2:
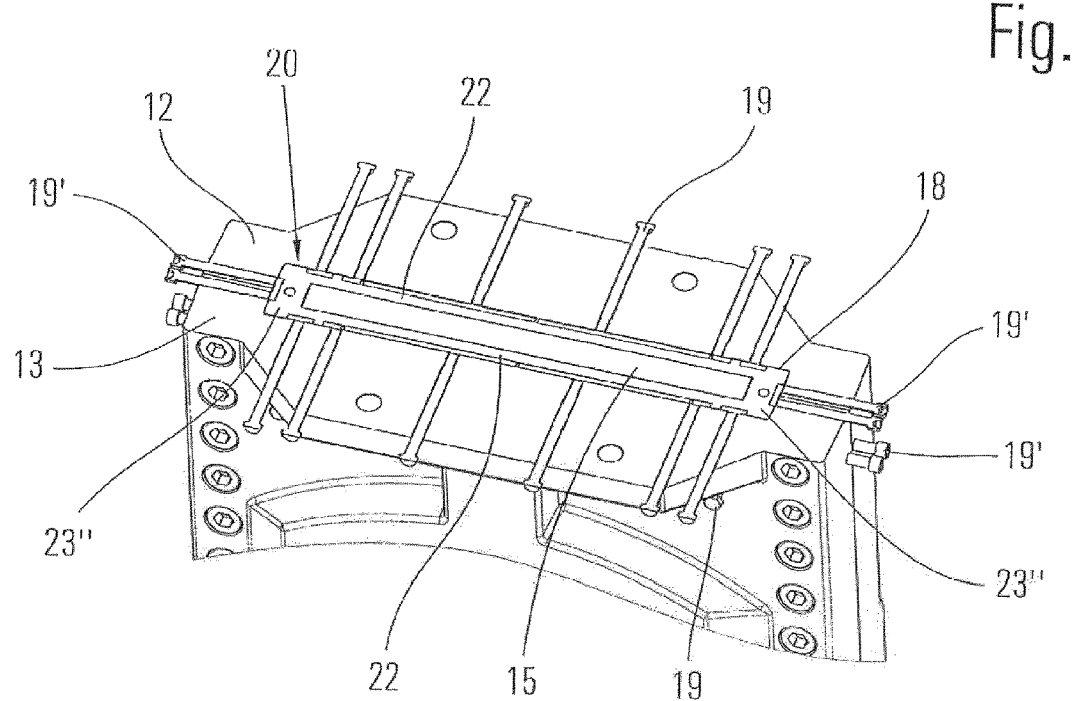
FIG. 2 is a perspective cross-section in the upper region of the slide valve according to FIG. 1.

Moreover, according to FIG. 2 adjusting means 19, 19' are provided in the housing parts 12, 13 at the level of these longitudinal grooves 17, 18 in the sealing arrangement 20, these adjusting means being, for example, screws which can be turned from outside the housing parts 12, 13 by appropriate screwdrivers.

With these adjusting means 19, in the middle or also in the end region of the upper longitudinal seals 22 or in the end region of the lower longitudinal seals 21, as well as with the adjusting means 19' pressing transversely onto the legs 23" of the profile, it is intended to be able to press the longitudinal seals 21, 22 or these legs 23" against the slide plate 15 in order to ensure the tightness in this region of the slide valve 10, this only being required after a certain operating time if leaks occur.

Accordingly, reinforcement plates or reinforcement strips 26, 26' corresponding to the adjusting means 19, 19' are respectively integrated into the longitudinal seals 21, 22 or the legs 23", which reinforcement plates or strips are advantageously produced from a metal sheet and absorb and distribute the adjusting forces over the longitudinal seals.

Figure 4:
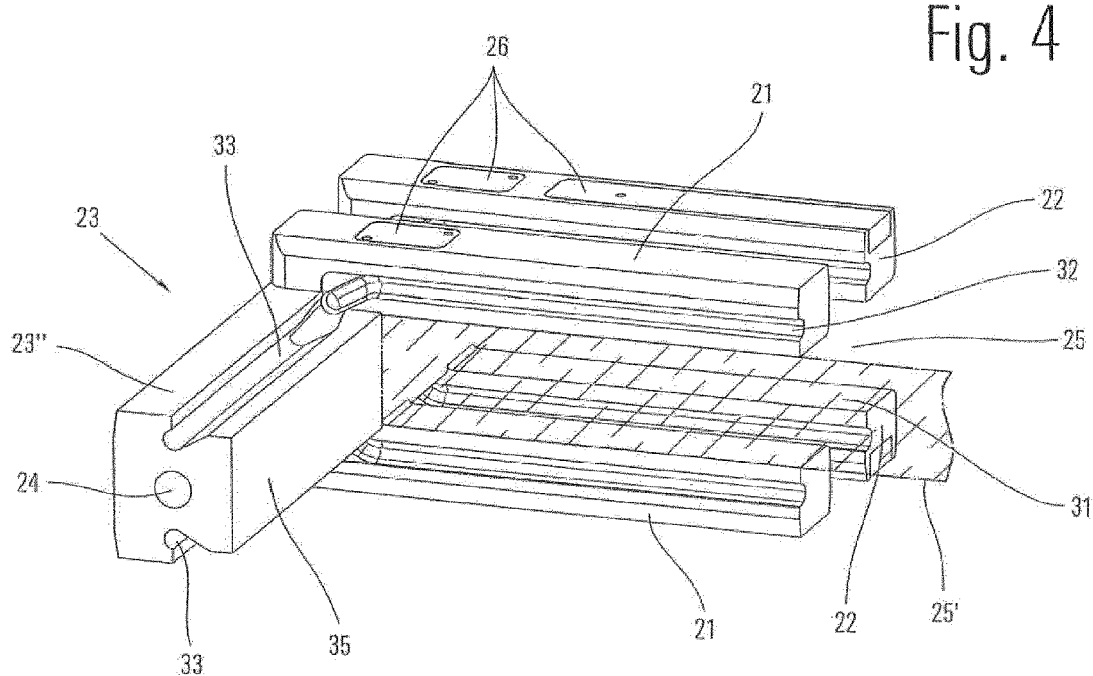
FIG. 4 is a perspective partial view of the sealing arrangement according to FIG. 3.

According to FIG. 4, together with the legs 23" of the profile 23, the longitudinal seals 21, 22 form a cavity 25 with a rectangular cross-section 25' which is indicated by a dot-and-dash line. This cross-section 25' corresponds here approximately to the cross-section of the slide plate so that the slide plate 15 is guided almost without play, and so tightly. Advantageously, with the lower longitudinal seals 21 disposed towards the through-opening 14, this cross-section 25' is somewhat smaller than the cross-section of the slide plate so that when the plate 15 is pushed in, pre-stressing generated by these longitudinal seals is brought about so as to optimize the sealing effect.

The longitudinal seals 21, 22 and the profile 23 have a rectangular cross-section at the rear, are each provided on both sides with a recess 32, 33, and on the inside are provided with a level bearing surface 31, 35 interacting with the outside of the slide plate 15, on the profile 23, this inside bearing surface 35 having a width that corresponds approximately to the thickness or the slide plate 15.

A reinforcement element 24, that is preferably integrated over the entire length, is embedded in the profile 23. On the legs 23" of the profile 23, the reinforcement element 24 runs approximately in the center of the profile 23, while in the arched part 23' of the profile 23, the reinforcement element is disposed in the outer region of the profile 23, as is evident in FIG. 1. Therefore, on the inside of this part, the profile 23 is more flexible in order to provide a better seal for the lower side of the plate 15.

Advantageously, this reinforcement element 24 projects with both ends out of the profile 23 and the housing 11 and is braced against the housing by screws 24' or the like, as indicated in FIG. 1. By this measure greater stability is generated in the housing on this sealing arrangement 20. A threaded bar can be used for this reinforcement element 24.

Figure 5:
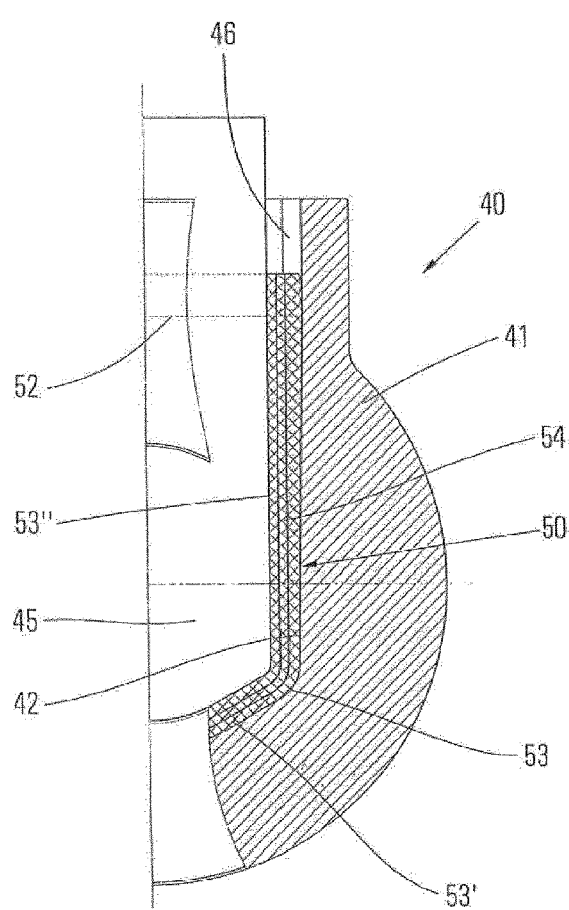
FIG. 5 is a half of one version of a longitudinally sectioned slide valve according to the invention.
Figure 6:
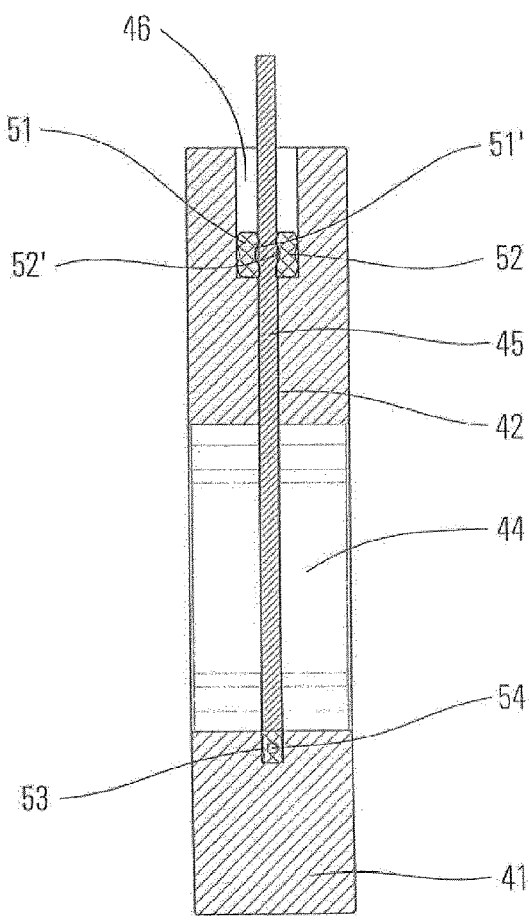
FIG. 6 is a cross-section of the slide valve according to FIG. 5.

FIG. 5 and FIG. 6 show a slide valve 40 with a housing 41 formed as a single piece and a transverse through-opening 44 at which lines are connected. A longitudinal slot 42 is formed in the housing 41 such that a slide plate 45 can be moved therein with almost no play and a U-shaped sealing arrangement 50 is disposed on its outer circumference. In the closed state of the slide valve 40 sealing on both sides and on the lower side between the slide plate 45 and the housing 41 is brought about with this sealing arrangement 50.

According to the invention, the sealing arrangement 50 is formed as a single piece from a profile 53 that partially surrounds the through-opening 44 and from the transverse longitudinal seals 51, 52 connected to the profile.

This U-shaped profile 53 extends almost to the upper end of the housing 41 and is connected here to the longitudinal seals 51, 52 disposed on both sides of the latter so that the through-opening 44 is sealed all round. This profile 53 is composed of a channel-shaped lower part 53' which runs flush to this rounding formed by the through-opening 44 and legs 53" passing from this part 53' on both sides.

Both the slide plate 45 and the single-piece sealing arrangement 50 according to the invention can be pushed into the housing 45 from above, and this results in simple fitting of the slide valve 40. Advantageously, a cover (not detailed) can be fastened onto the housing 41.

Moreover, a recess 46 is formed on the upper side of the housing 41, which recess has dimensions such that the longitudinal seals 51, 52 can be placed therein with almost no play. On their inner surfaces 51', 52' touching the slide plate 45 the longitudinal seals 51, 52 preferably have an undulating surface, as seen in the direction of pushing, so that lip-like overlays are formed which extend along the closing plate surfaces over the entire width and form an optimal seal.

In the fitted state, these longitudinal seals 51, 52 and the legs 53" of the profile 53 have dimensions on the inside, on the contact surfaces with the slide plate 45, such that between the slide plate 45 in the closed position and the sealing arrangement there is a contact pressure which allows one to obtain a sufficient seal.

Moreover, embedded in the profile 53 is a reinforcement element 54 preferably made of a metal and which has a rectangular cross-section.

Figure 7:
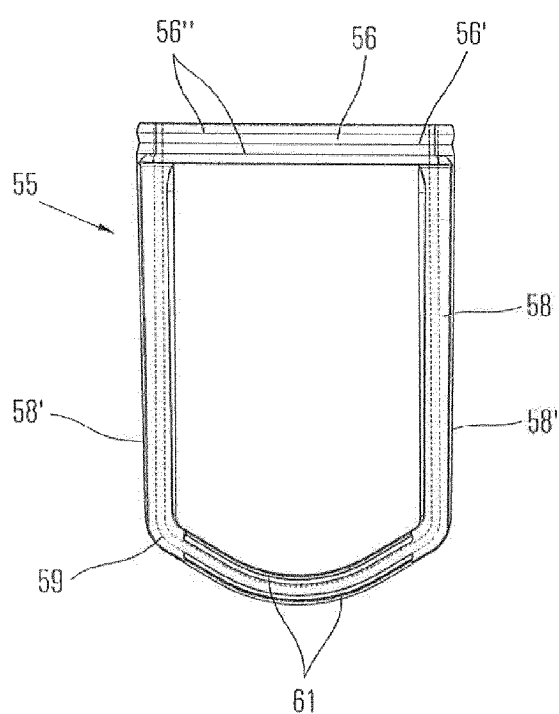
FIG. 7 is a view of a version of a sealing arrangement for the slide valve according to FIG. 5.
Figure 8:
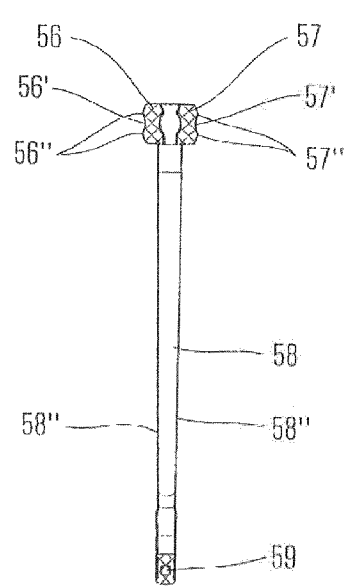
FIG. 8 is a cross-section of the sealing arrangement according to FIG. 7.

FIG. 7 and FIG. 8 show a version of a sealing arrangement 55 according to the invention which is suitable for installation in a slide valve 50 according to FIG. 5, and so in the following only the differences with respect to that of FIG. 5 will be explained.

The two longitudinal seals 56, 57 at the upper end of the profile 58 of the sealing arrangement 55 are provided in cross-section with undulating surfaces both on the outside and on the inside as seen in the direction of pushing so that in each case two elongate lip overlays 56", 57" and one central longitudinal groove 56', 57' are formed.

In addition, the two legs of the profile 58 taper or are formed conically on their outsides 58' which are turned away from one another and/or on their lateral faces 58" in the closing direction. Therefore, this sealing arrangement 55 can be easily inserted into the housing, and when it is worn, it can also be removed again easily. Advantageously, the corresponding surfaces of the corresponding longitudinal slot 42 are likewise formed in the housing 41 with the same conicity as the outsides 58' and the lateral faces 58" of the sealing arrangement 55.

Furthermore, a reinforcement element 59 which is embedded in the profile 58 is likewise included which extends downwards and on both sides almost to the upper profile end; and in addition, longitudinal ribs 61 projecting outwards to the side and running over almost its entire length are assigned to the channel-shaped lower part of the profile 58, the purpose of which is to provide a better hold of the profile in the longitudinal slot 42 within the housing 41.

The invention is sufficiently displayed by the exemplary embodiments explained above. However, it may also be illustrated by other versions. Thus, in principle, just one instead of two longitudinal seals per side could also be provided. Also, no reinforcement element or a number of reinforcement elements could also be embedded in the profile.

In principle, this profile in the arched part 23' could also be formed with a lower side that is only slightly rounded or that is almost in a straight line instead of circularly, depending on the type of valve.

Needless to say, the longitudinal seals could also be formed in an arch or the like instead of being elongate.

The invention claimed is:

1. A slide valve, comprising:
a housing defining a through-opening and a longitudinal slot communicating with said through-opening;
a slide plate movable in said housing between a closed position closing said through-opening and an open position in which said through-opening is open to enable conveyance of media through the slide valve; and
a single-piece sealing arrangement for providing sealing for the slide valve, said sealing arrangement being fixed or inserted into said longitudinal slot and comprising:
a profile that partially surrounds said through-opening and has first and second lateral faces, respectively, on upstream and downstream sides of said profile, said profile including first and second legs; and
at least one first transverse longitudinal seal on a first side of said through-opening, said at least one first transverse longitudinal seal having first and second ends connected to said first lateral face of said profile, said first end of said at least one first transverse longitudinal seal being connected to said first leg and said second end of said at least one first transverse longitudinal seal being connected to said second leg; and
at least one second transverse longitudinal seal on said first side of said through-opening, said at least one second transverse longitudinal seal having first and second ends connected to said second lateral face of said profile, said first end of said at least one second transverse longitudinal seal being connected to said first leg and said second end of said at least one second transverse longitudinal seal being connected to said second leg,
said first and second legs each having respective outside surfaces extending between said first and second lateral faces of said profile, said respective outside surfaces face away from said slide plate and taper toward one another or are formed conically in a first direction extending from said first side of said through-opening toward a second side of said through-opening opposite said first side of said through-opening,
portions of said first and second lateral faces of said profile on said first and second legs tapering toward one another or being formed conically in said first direction
said housing including surfaces defining said longitudinal slot that correspond to the outside surfaces of said first and second legs and to the portions of said first and second lateral faces of said profile on said first and second legs.

2. The slide valve of claim 1, wherein said at least one first transverse longitudinal seal comprises two first transverse longitudinal seals spaced apart from and parallel to one another, and said at least one second transverse longitudinal seal comprises two second transverse longitudinal seals spaced apart from and parallel to one another.

3. The slide valve of claim 1, wherein said housing comprises first and second housing parts, said first housing part defining a respective longitudinal groove for each of said at least one first transverse longitudinal seal and said second housing part defining a respective longitudinal groove for each of said at least one second transverse longitudinal seal, said longitudinal grooves for said at least one first transverse longitudinal seal and for said at least one second transverse longitudinal seal extending in a direction transverse to a direction of movement of said slide plate between the closed and open positions.

4. The slide valve of claim 1, wherein said housing defines a bore hole that forms said through-opening and said profile further comprises an arched part between said first and second legs on said second side of said through-opening opposite said first side of said through-opening, said arched part being rounded in correspondence with a shape of said through-opening and being fitted in said housing such that an inner surface of said arched part facing said through-opening is flush with said bore hole.

5. The slide valve of claim 1, wherein said first and second legs, said at least one first transverse longitudinal seal and said at least one second transverse longitudinal seal are positioned relative to one another to define at least one cavity having a rectangular cross-section corresponding to a cross-section of said slide plate such that said slide plate is guided through said at least one cavity when moving between the closed and open positions, each of said at least one cavity being defined between said first and second legs on opposite sides, one of said at least one first transverse longitudinal seal and one of said at least one second transverse longitudinal seal opposite said one of said at least one first transverse longitudinal seal.

6. The slide valve of claim 1, further comprising adjusting means for adjusting sealing of said sealing arrangement against said slide plate.

7. The slide valve of claim 6, wherein said housing defines a respective longitudinal groove for each of said at least one first transverse longitudinal seal and each of said at least one second transverse longitudinal seal, said adjusting means being actuatable from an outside of said housing and selectively pressing said at least one first transverse longitudinal seal or said at least one second transverse longitudinal seal against said slide plate.

8. The slide valve of claim 6, wherein said adjusting means are actuatable from an outside of said housing and selectively press said first and second legs against said slide plate.

9. The slide valve of claim 1, wherein each of said at least one first transverse longitudinal seal and said at least one second transverse longitudinal seal includes a level bearing surface facing said slide plate, and side surfaces each including a recess.

10. The slide valve of claim 1, wherein said profile is U-shaped and in cross-section, has a level bearing surface facing said slide plate, side surfaces each including a recess, and a rectangular cross-section at a rear location farthest from said slide plate.

11. The slide valve of claim 1, wherein said profile has a width on an inside closest to said slide plate corresponding to a thickness of said slide plate.

12. The slide valve of claim 1, wherein said housing is formed as a single piece defining said longitudinal slot, and said slide plate is fixed or inserted into said longitudinal slot.

13. The slide valve of claim 1, wherein said sealing arrangement is made of plastic.

14. The slide valve of claim 1, wherein said sealing arrangement is made of polyurethane.

15. The slide valve of claim 1, further comprising at least one reinforcement element arranged in said profile.

16. The slide valve of claim 15, wherein said at least one reinforcement element is embedded in said profile over an entire length of said profile.

17. The slide valve of claim 15, wherein said at least one reinforcement element is situated proximate a center of said first and second legs of said profile, said profile further comprising an arched part situated between said first and second legs, said at least one reinforcement element being situated in an outer region of said arched part of said profile farthest from said through-opening.

18. The slide valve of claim 1, further comprising reinforcement plates arranged in said at least one first transverse longitudinal seal on a side facing away from said slide plate and in said at least one second transverse longitudinal seal on a side facing away from said slide plate.

19. The slide valve of claim 1, further comprising reinforcement plates arranged in said first and second legs of said profile.

20. The slide valve of claim 1, wherein said at least one first transverse longitudinal seal consists of a single first transverse longitudinal seal and said at least one second transverse longitudinal seal consists of a single second transverse longitudinal seal.

* * * * *